No. 682,454. Patented Sept. 10, 1901.
A. D. CONVERSE.
STOP MOTION FOR MECHANICAL TOYS.
(Application filed Apr. 6, 1901.)
(No Model.)
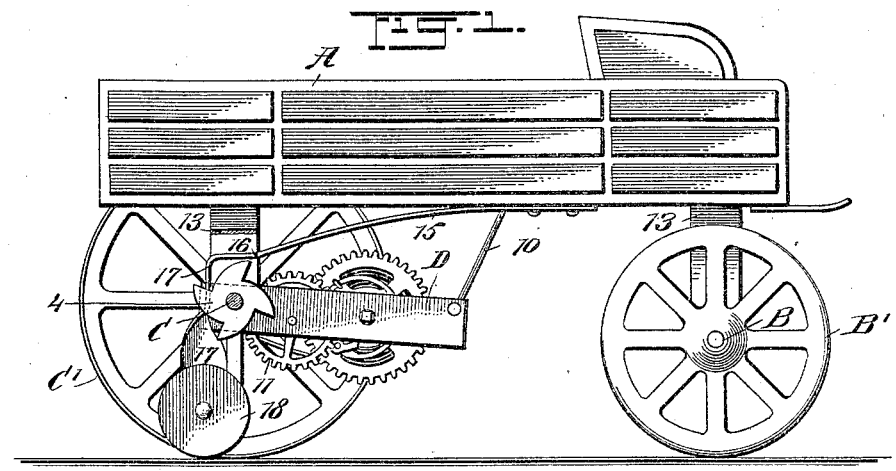
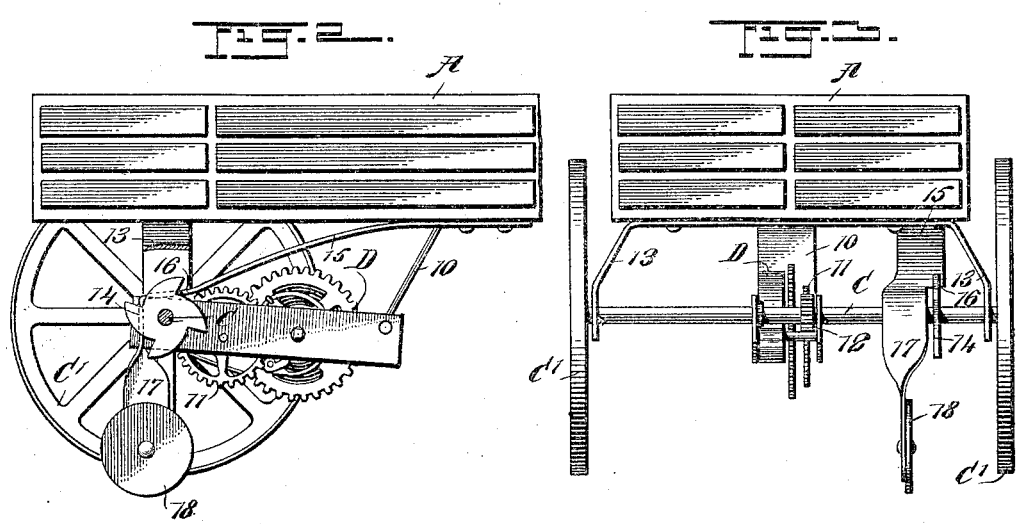
WITNESSES:
INVENTOR
Atherton D. Converse
BY
ATTORNEYS

UNITED STATES PATENT OFFICE.

ATHERTON D. CONVERSE, OF WINCHENDON, MASSACHUSETTS.

STOP-MOTION FOR MECHANICAL TOYS.

SPECIFICATION forming part of Letters Patent No. 682,454, dated September 10, 1901.

Application filed April 6, 1901. Serial No. 54,614. (No model.)

*To all whom it may concern:*

Be it known that I, ATHERTON D. CONVERSE, a citizen of the United States, and a resident of Winchendon, in the county of Worcester and State of Massachusetts, have invented a new and Improved Stop-Motion for Mechanical Toys, of which the following is a full, clear, and exact description.

The purpose of the invention is to provide a simple mechanism for automatically preventing the wheels of a motor-controlled vehicle from turning when the motor is in force but the wheels are out of engagement with a support upon which the vehicle is to travel, which mechanism also automatically permits the wheels to turn and the motor to act when the wheels are brought into contact with the surface upon which the vehicle is to move.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vehicle having the improvement applied, the driving-axle being in section, and also a portion of the support for the axle, the motor being shown free to work. Fig. 2 is a side elevation of a portion of a vehicle and a section through the driving-axle and its support, the motor being shown locked against action; and Fig. 3 is a rear elevation of the vehicle and the improvement applied.

A represents the body of a vehicle, B one of the axles, and C the other axle, which may be termed the "driving-axle." The axle B has wheels B' attached thereto, and the driving-axle C is likewise provided with wheels C'.

D represents a motor, which is preferably of spring type, and one end of the motor-frame is attached by a suitable bracket 10 to the bottom of the vehicle, while the other end is mounted on the driving-axle C. The motor may communicate motion to the driving-axle in any suitable or approved manner. In the drawings one of the gears 11 of the motor is shown in mesh with a pinion 12 on the driving-axle C. The axles are held to turn in suitable pedestals or hangers 13, attached to the body of the wagon and extending downward therefrom. A ratchet-wheel 14 is secured to the driving-axle C; but instead of the ratchet-wheel 14 one or more pins or projections may be located on or secured to the driving-axle C.

In connection with the ratchet-wheel 14 or its equivalent a stop device is employed. This stop device consists of a spring-arm 15, one end of which is attached to the bottom of the vehicle or to an equivalent support, and this spring-arm is carried over the driving-axle and is provided with a projection 16, adapted to engage with the teeth of the ratchet-wheel 14 or with a projection on the driving-axle when such projection is employed. The said spring-arm after being passed over the driving-axle is carried downward, the downwardly-extending section being designated as 17 in the drawings, and said section extends to a point below the horizontal plane of the bottom of the wheels C' on the driving-axle C. The lower end of the extension 17 of the spring-arm 15 may be brought in direct engagement with the surface over which the vehicle is to travel; but preferably a roller or what may be termed a "fifth-wheel" 18 is mounted on the lower end of the extension 17 of said spring-arm, as shown in the drawings.

When the vehicle is lifted up from the support upon which it is to travel, the projection 16 from the spring-arm 15 will engage with the teeth of the ratchet-wheel 14 or one of projections from the driving-axle when such projections are used as a substitute for the ratchet-wheel, and thus the wheels of the driving-axle will be prevented from turning, since the driving-axle itself cannot turn, and the motor may be wound up without any loss of power; but the moment the vehicle is placed upon a support the fifth-wheel 18 will engage first with the support and the spring-arm 15 will be forced upward, carrying the projection 16 out of engagement with the ratchet-wheel 14 or the projection on the shaft C, thereby permitting the motor to act in a driving capacity on the driving-axle of the vehicle.

Having thus described my invention, I claim as new and desire to secure by Letters Patent—

1. In a mechanical toy, a motor-controlled shaft having projections therefrom, and a check device consisting of a spring-arm adapted for engagement with the projections on the shaft, and a roller carried by the arm, adapted for engagement with the surface on which the vehicle is to travel.

2. In a mechanical toy, a motor-controlled shaft, a projection from the said shaft, a spring-arm adapted for attachment to the body of the vehicle, the said arm having a section for engagement with the said projection, and a second section which extends below the projection, and a fifth-wheel carried by the lower extension of the arm, which fifth-wheel in the normal position of the arm is below the horizontal plane of the peripheral surfaces of the wheels on the driving-axle, as set forth.

In testimony whereof I have signed my name to this specification in the presence of two subscribing witnesses.

ATHERTON D. CONVERSE.

Witnesses:
J. FRED. ACKER,
JNO. M. RITTER.